(12) United States Patent
Kamijima

(10) Patent No.: US 6,207,466 B1
(45) Date of Patent: Mar. 27, 2001

(54) METHOD OF MANUFACTURING THIN FILM MAGNETIC HEAD

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/400,304

(22) Filed: Sep. 21, 1999

(30) Foreign Application Priority Data

Sep. 22, 1998 (JP) .................................................. 10-268788

(51) Int. Cl.⁷ .................................................. H01L 21/00
(52) U.S. Cl. .............................. 438/3; 360/125; 360/126; 428/694 T
(58) Field of Search ................................. 438/3; 360/125, 360/126; 428/694 T

(56) References Cited

U.S. PATENT DOCUMENTS 6,063,512 * 5/2000 Osaka et al. .......................... 428/694

FOREIGN PATENT DOCUMENTS 9-180127   7/1997 (JP) .

* cited by examiner

Primary Examiner—Charles Bowers
Assistant Examiner—Hsien-Ming Lee

(74) Attorney, Agent, or Firm—Oliff & Berridge, PLC

(57) ABSTRACT

A thin film magnetic film having a bottom yoke, a top yoke, a thin film coil having a part sandwiched between the bottom yoke and the top yoke, a coil insulating film to support the thin film coil in insulation, a write gap film intervened at least between the pole portions of the top and the bottom yokes opposing to a magnetic recording medium and a substrate to support the bottom yoke, the top yoke, the thin film coil, the coil insulating film and the write gap film in which the coil insulating film has an inclined part rising up from the rear ends of the pole portions and the top yoke has a part rising up alongside the inclined part of the coil insulating film is manufacturing by the following steps: After the bottom yoke, the write gap film, the thin film coil and the coil insulating film are formed, an antireflection film is formed on the whole surface of the coil insulating film and the exposing surface of the write gap film. Then, the part of the antireflection film formed on an area corresponding to the pole portions on the exposing surface of the write gap film is selectively removed, and a photoresist is formed so as to cover the antireflection film, the coil insulating film and an area of the write gap film corresponding to the pole portions. A resist frame having an opening with a desired pattern is formed precisely by photolithography for the photoresist with a reflectance of a light at the coil insulating film being controlled, and thereafter, the part of the antireflection film in the opening of the resist frame is removed. Then, the top yoke is formed in the opening of the resist frame is formed, and thereafter, the resist frame and the remaining antireflection film is removed.

9 Claims, 13 Drawing Sheets

FIG_1
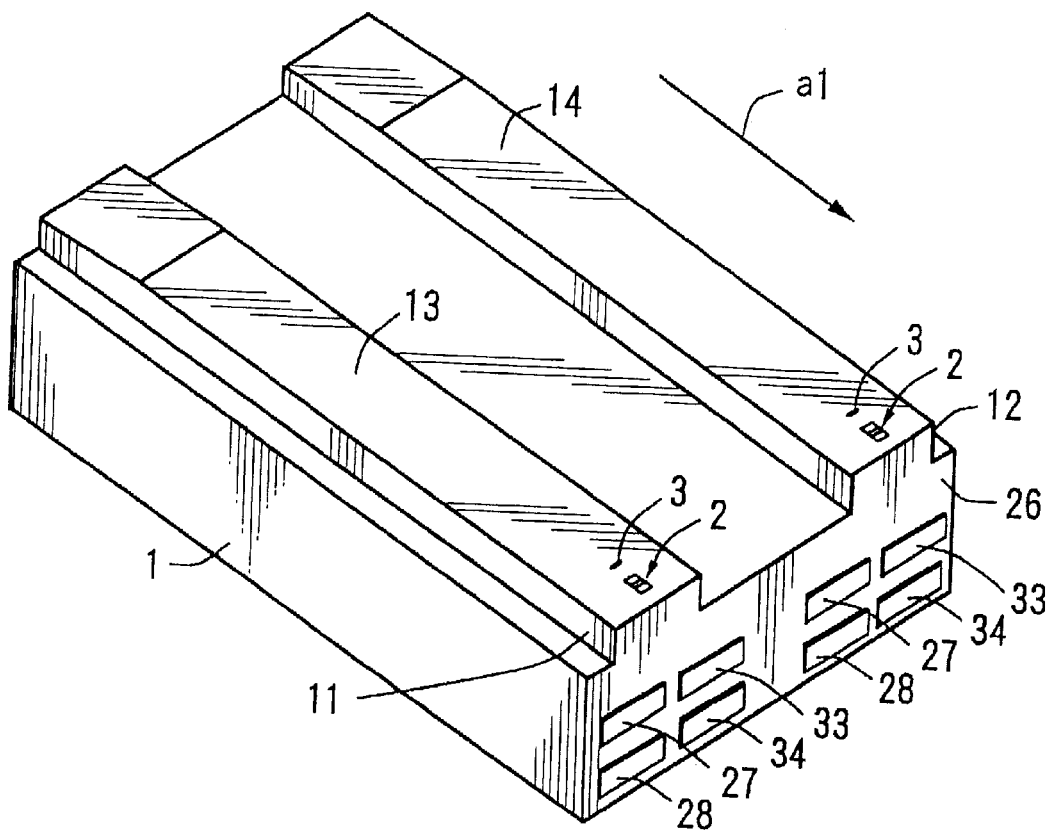

FIG_2
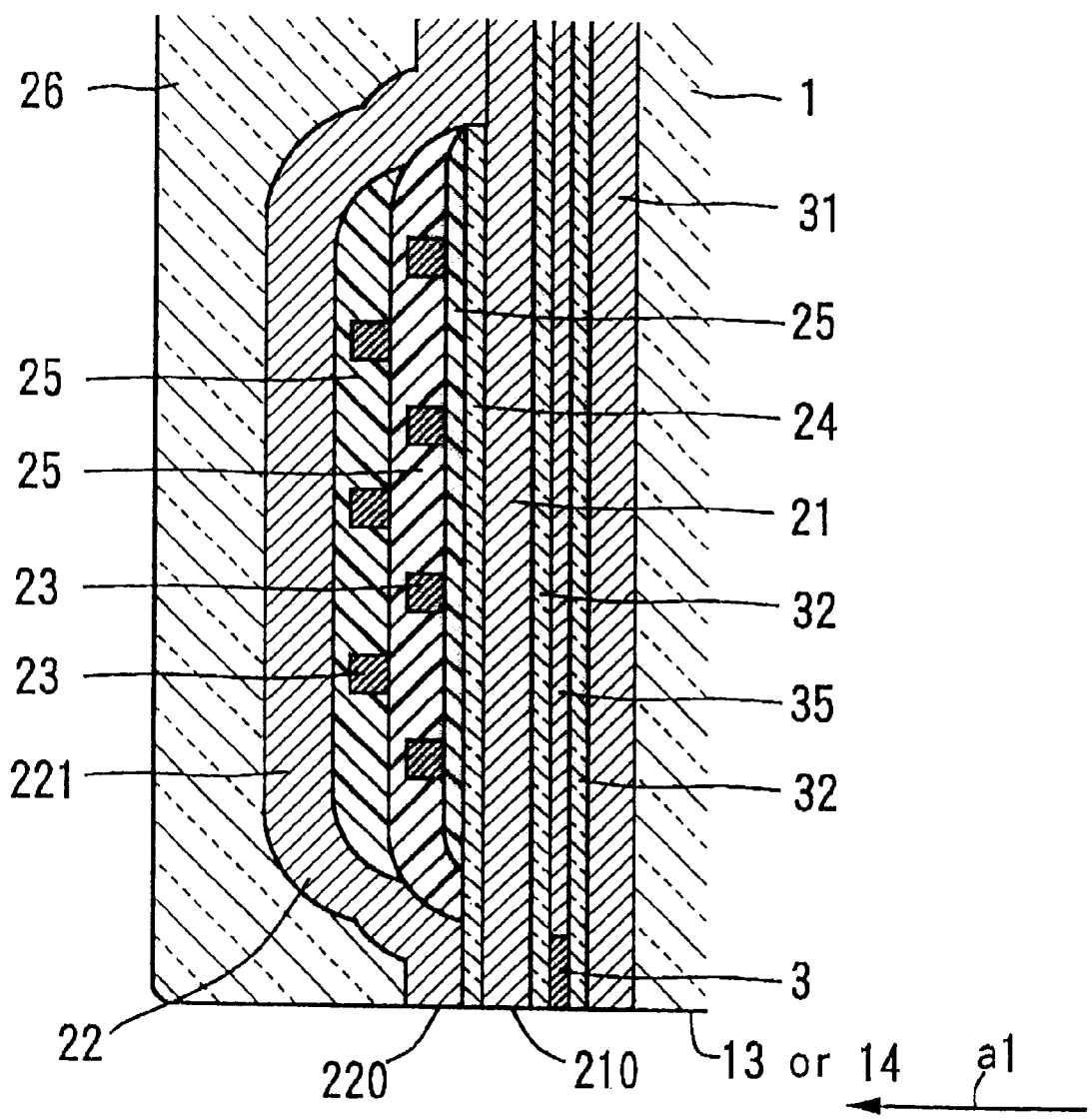

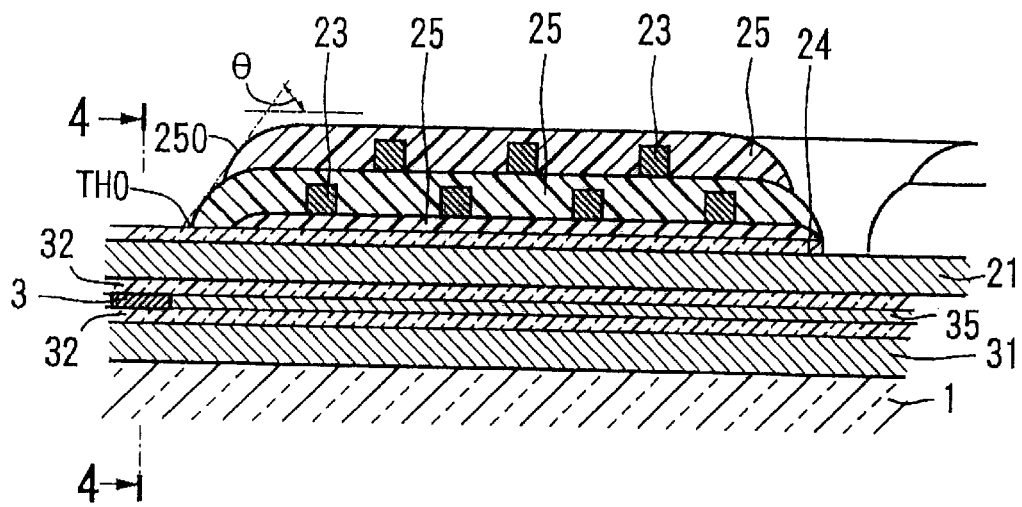
FIG_3
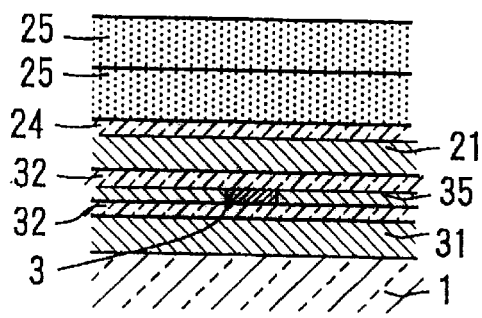
FIG_4
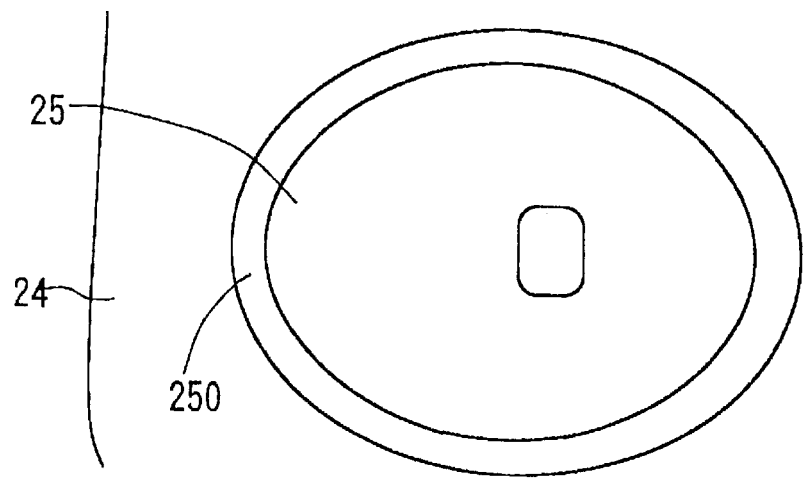
FIG_5

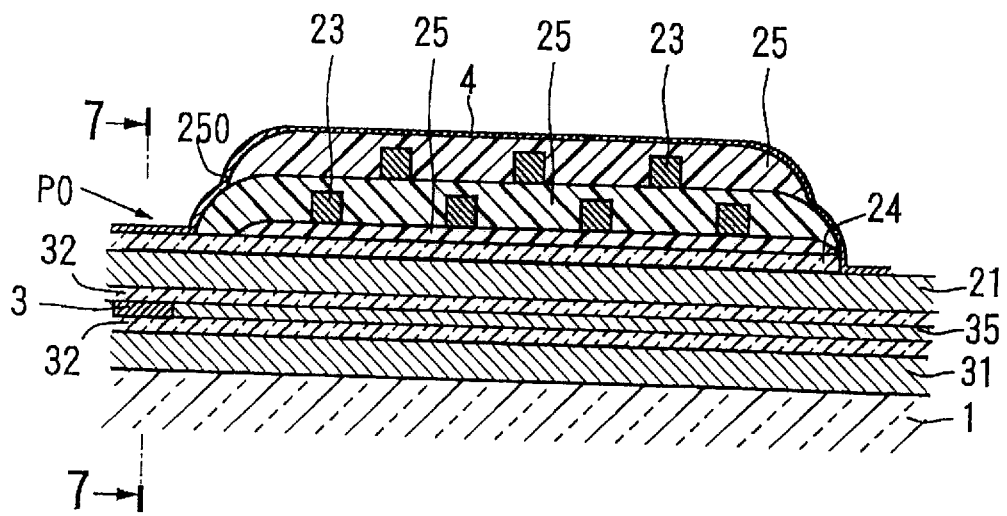
FIG_6
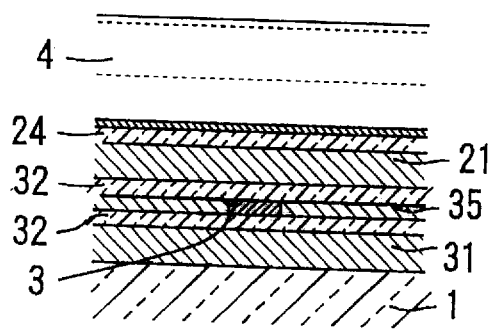
FIG_7
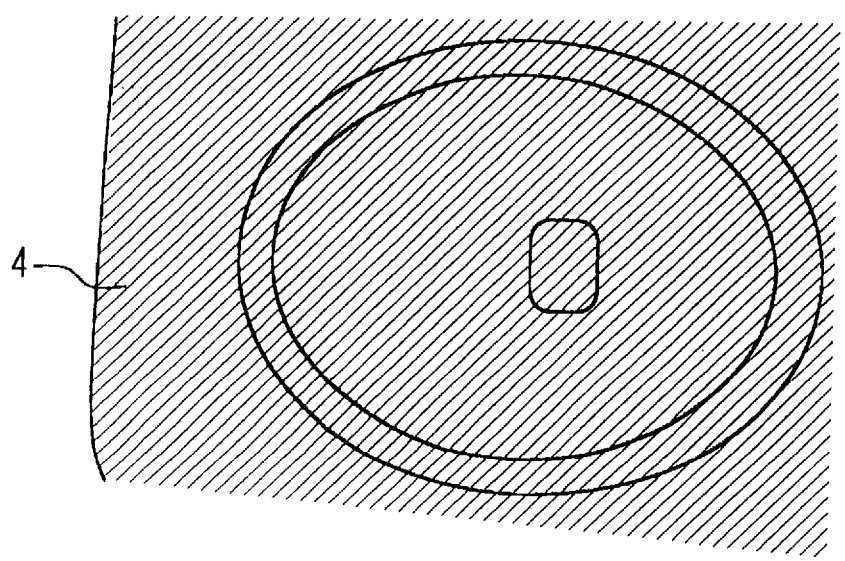
FIG_8

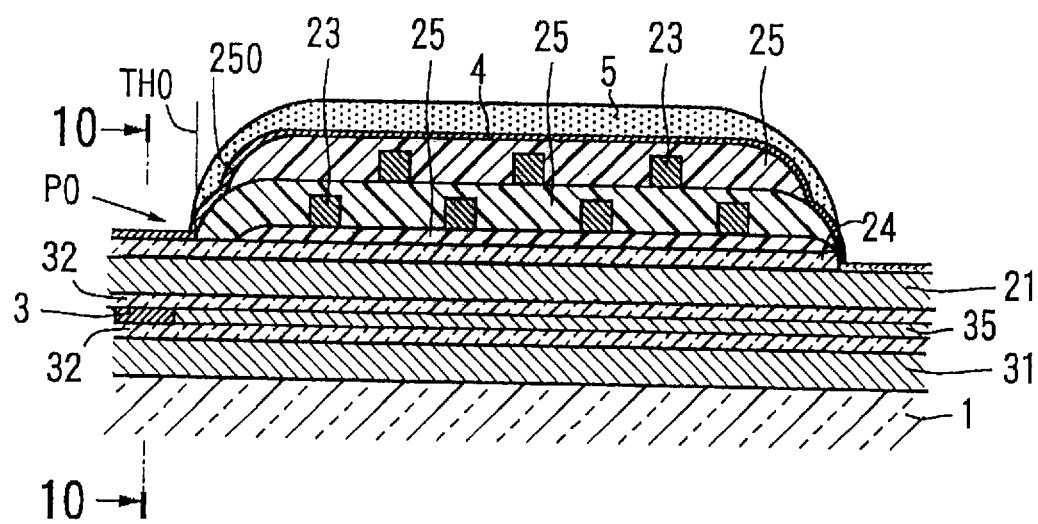
FIG_9
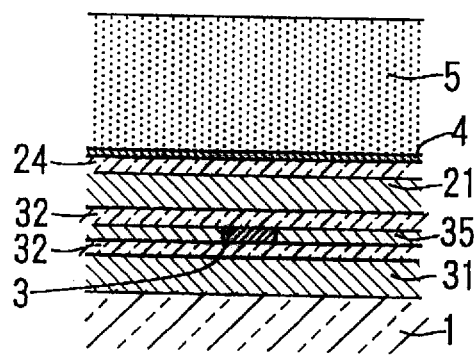
FIG_10
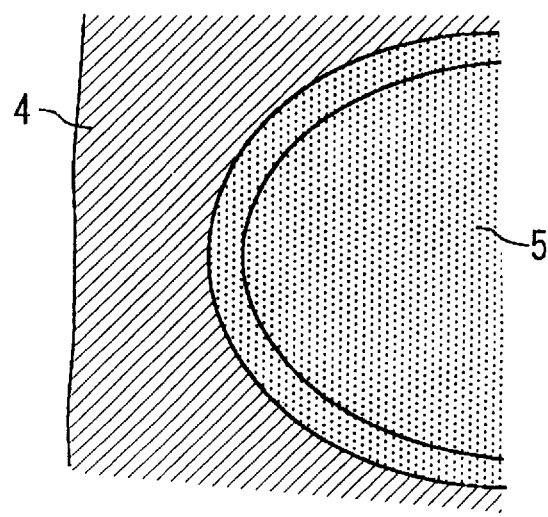
FIG_11

FIG_12
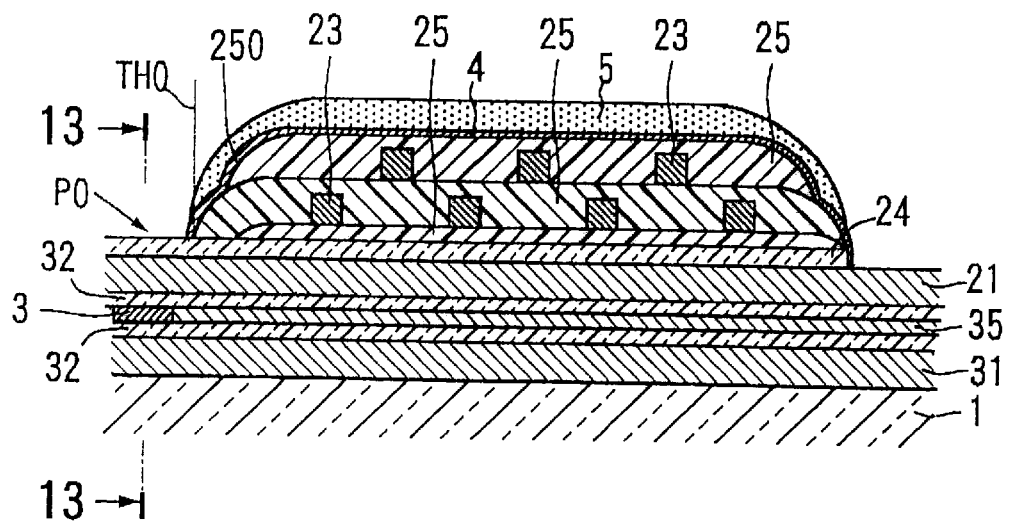
FIG_13
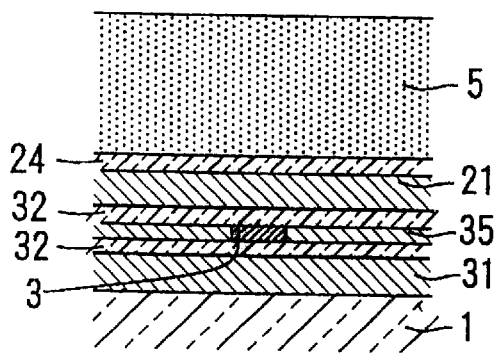
FIG_14
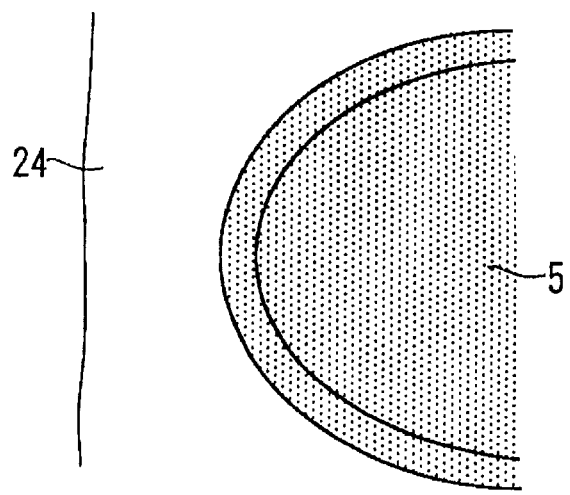

FIG_15
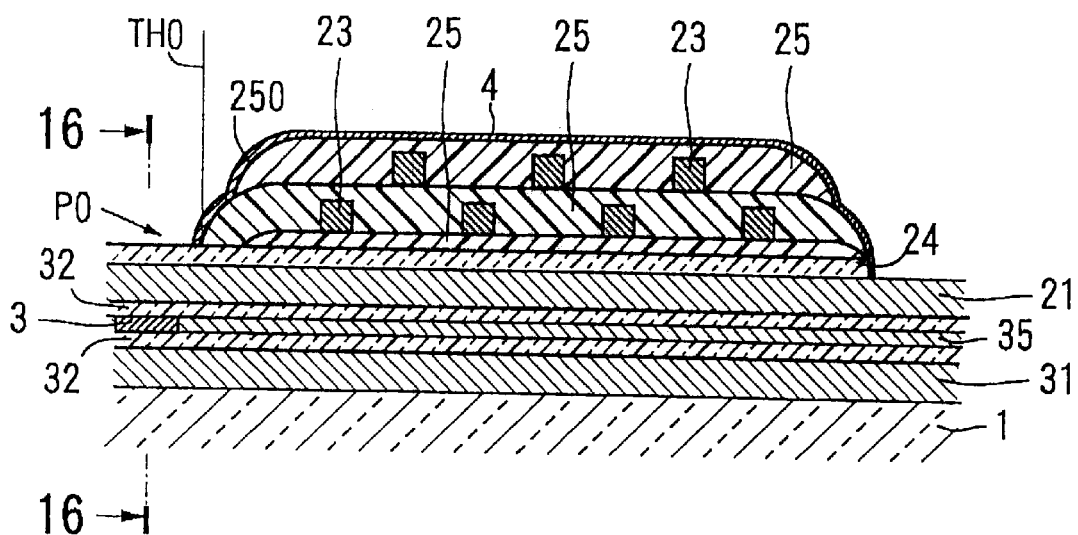
FIG_16
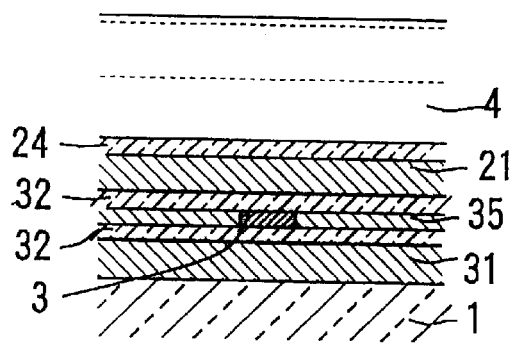
FIG_17
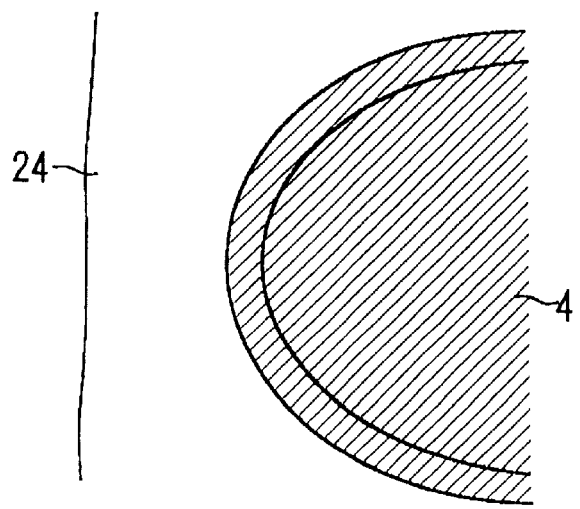

FIG._18
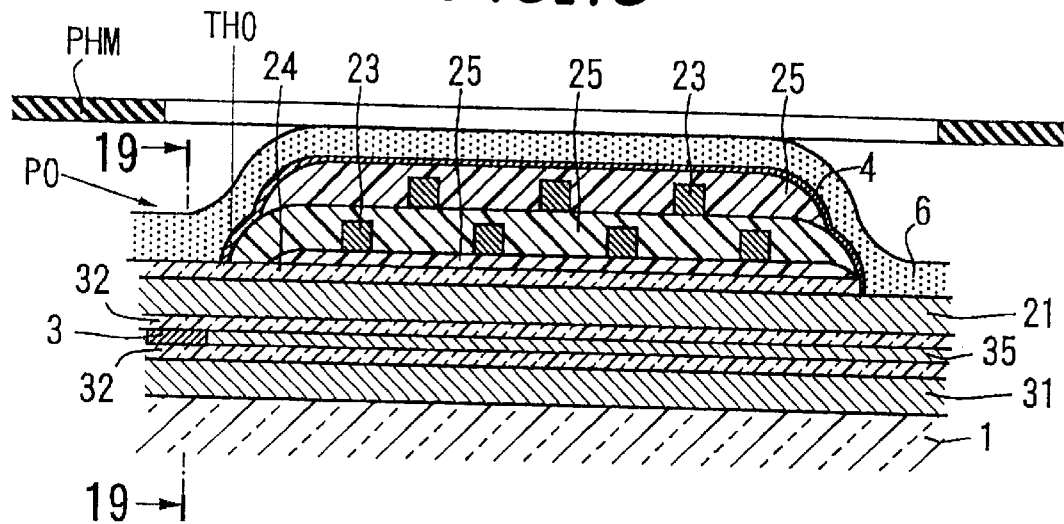
FIG._19
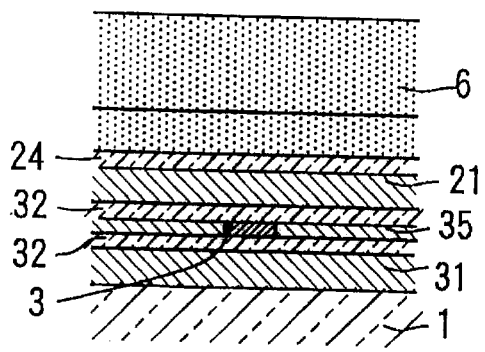
FIG._20
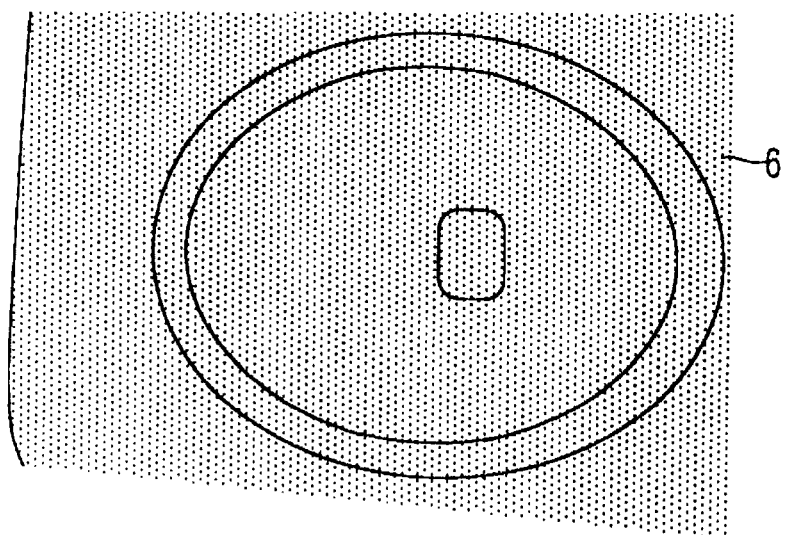

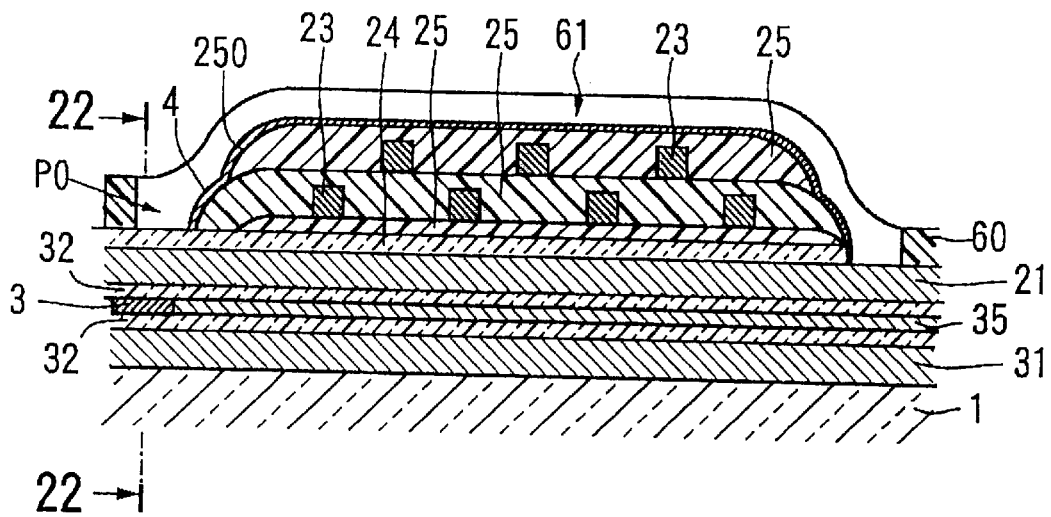
FIG_21
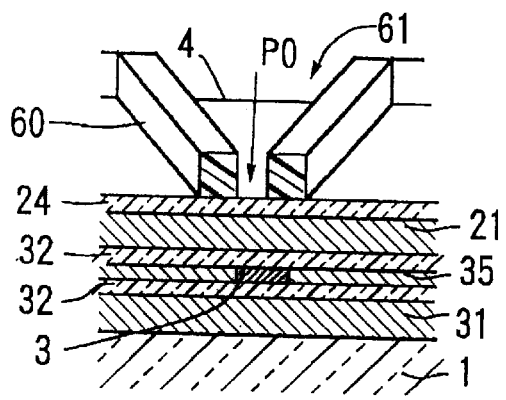
FIG_22
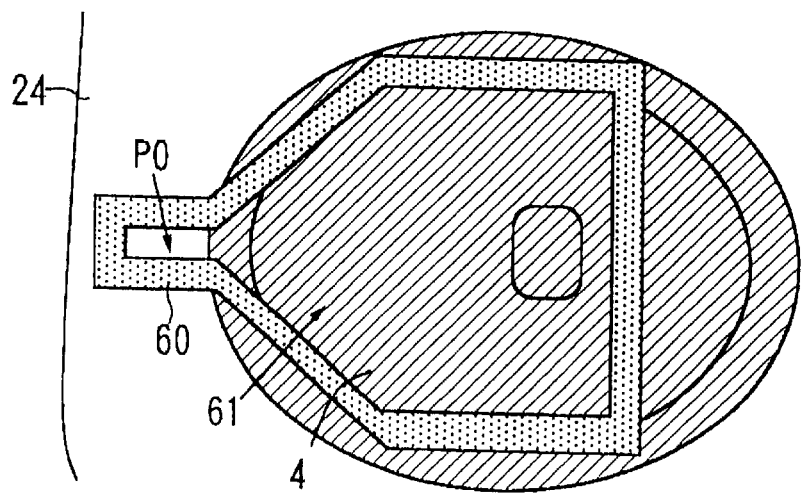
FIG_23

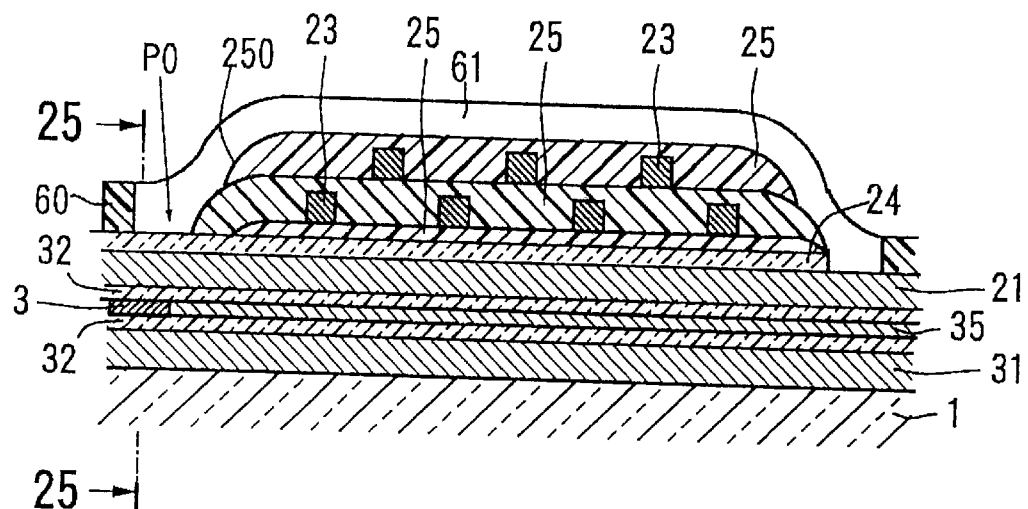
FIG_24
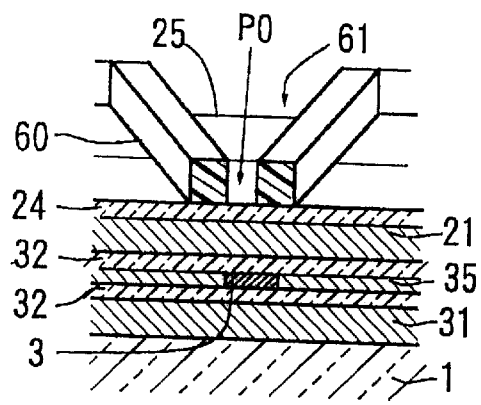
FIG_25
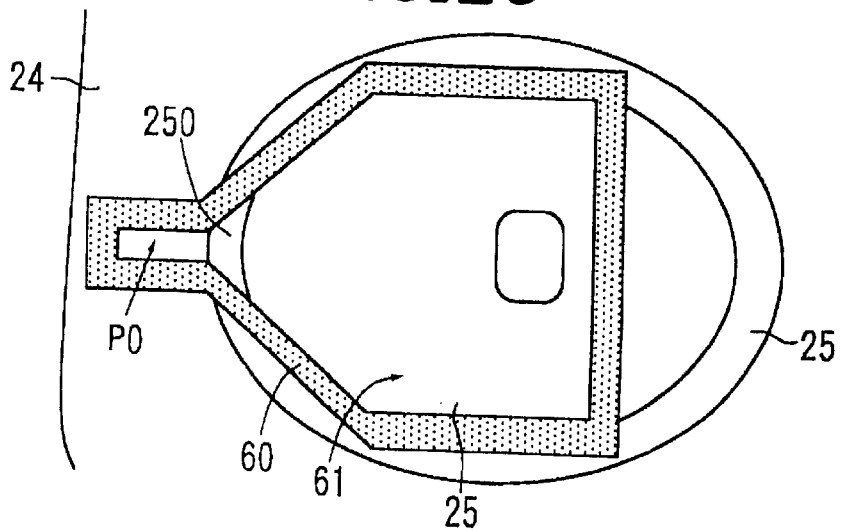
FIG_26

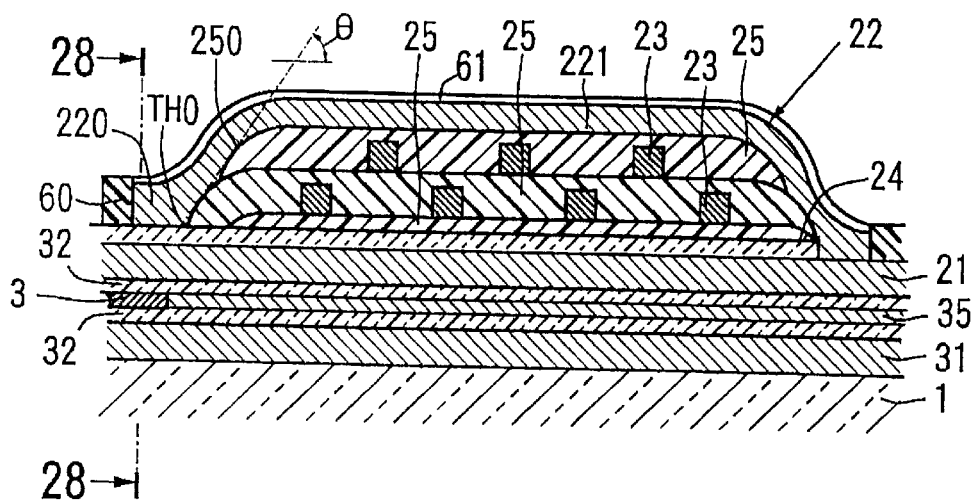
FIG_27
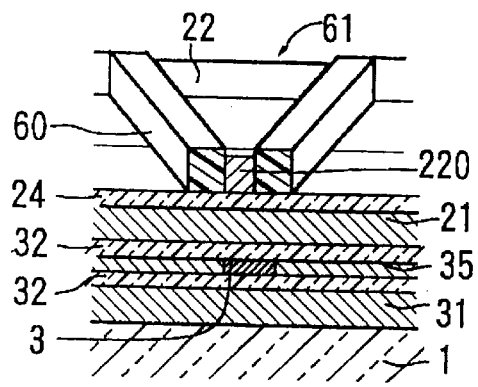
FIG_28
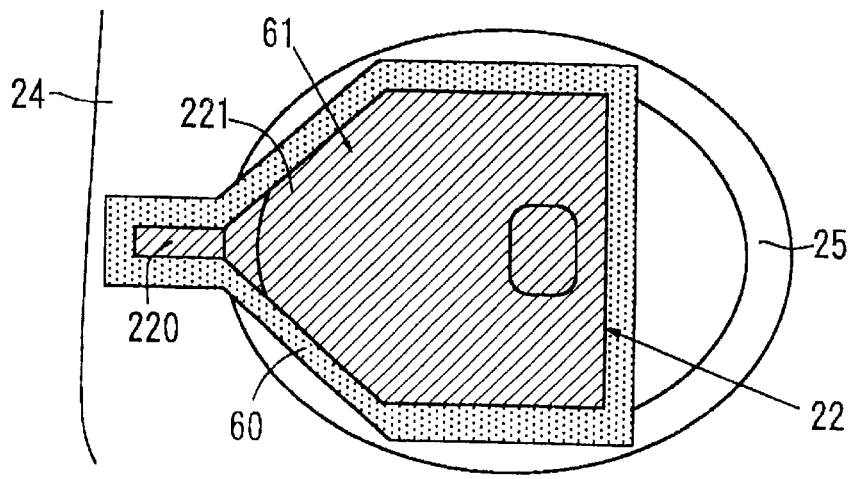
FIG_29

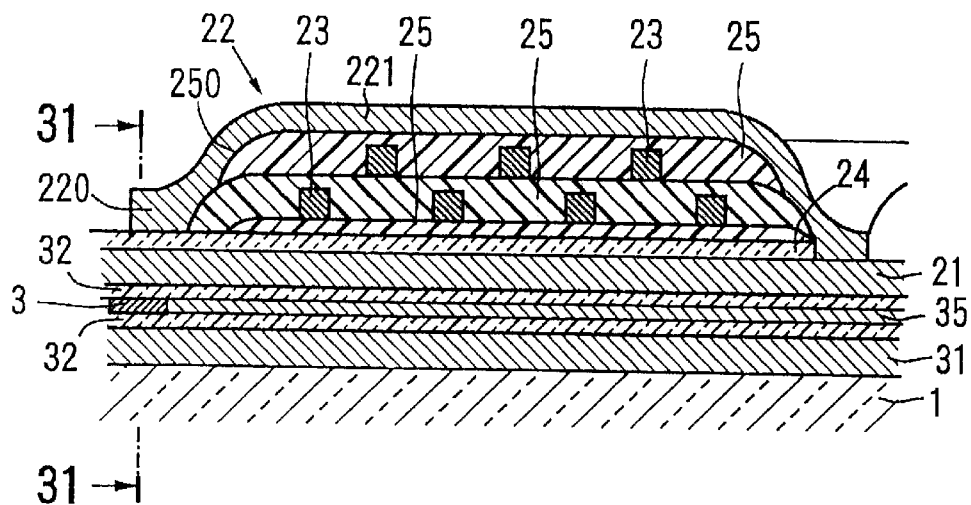
FIG_30
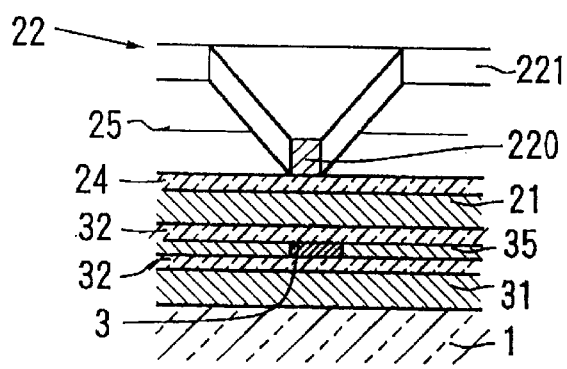
FIG_31
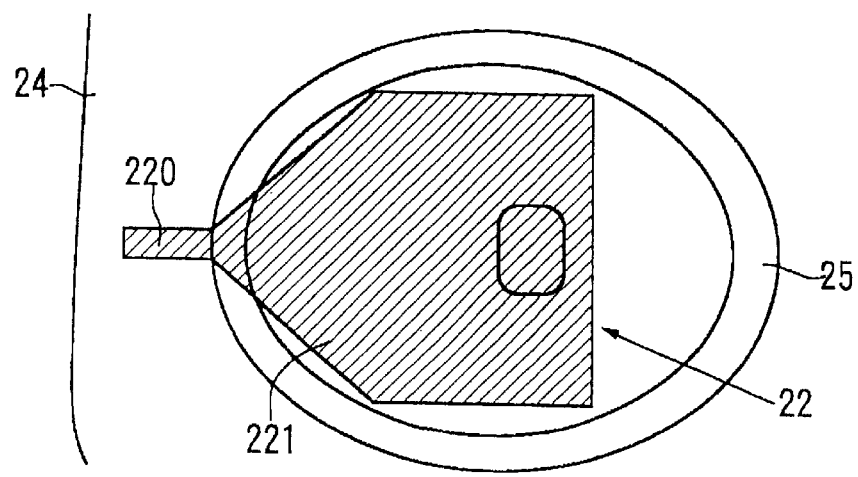
FIG_32

METHOD OF MANUFACTURING THIN FILM MAGNETIC HEAD

BACKGROUND OF THE INVENTION

1. Field of the Invention

This invention relates to a method of manufacturing a thin film magnetic head having a first magnetic film constituting a bottom yoke, a second magnetic film constituting a top yoke, a thin film coil having the portion sandwiched between the first and the second magnetic films, a coil insulating film insulation-separating the thin film coil, a write gap film at least intervened between the pole portions of the first and the second m Oagnetic films opposing to a magnetic recording medium, and a substrate supporting the first and the second magnetic films, the thin film coil, the coil insulating film and a write gap film, particular a method of manufacturing a thin film coil head formed on a coil insulating film insulation-separating a thin film coil and having a precisely formed pole portion of a second magnetic film constituting a top yoke.

2. Related Art Statement

In a method of manufacturing a thin film magnetic head, normally, a second magnetic film constituting a top yoke is formed after a coil insulating film to support a first magnetic film (bottom yoke), a write gap film and a thin film coil are formed on a wafer. In forming the second magnetic film, a plated underfilm to form a second magnetic film is formed on the whole surface of the wafer including the coil insulating film by sputtering, for example. Next, a photoresist is applied on the surface of the plated underfilm, which is photolithography- processed to form a resist frame having an opening at the part for the second magnetic film to be formed. Subsequently, within the area surrounded by the resist frame, a second magnetic film is formed by a method such as an electroplating method. Although a plated film is film is deposited on the resist frame, it is removed.

One of the problems in the second magnetic film-forming process is that in the photolithography process to form a resist frame, a light for expose is reflected at the surface of the coil insulating film and the part of the photoresist except the area thereof to be defined by a photomask is exposed, resulting in the degradation of the pattern precision of the resist frame and thereby the degradation of the pattern precision of the second magnetic film.

The problem become conspicuous in the pole portion of the second magnetic film. The pole portion of the second magnetic film is opposed to the first magnetic film via the write gap film. The coil insulating film is positioned backward from the pole portion and rises up on the surface of the write gap film with inclined at a given angle. The starting point of the rising up is called as a "throat height=0 point", and the angle of the rising up is called as an "apex angle" which are important factor to determine the characteristics of the thin film magnetic head.

The second magnetic film is formed so as to constitute the pole portion parallel to the write gap film and the first magnetic film up to the throat height=0 point and be inclined at the apex angle toward the upper surface of the coil insulating film from the throat height=0 point.

Thus, in forming the resist frame for the second magnetic film, the photoresist part stuck on the inclined part at the apex angle toward the upper surface of the coil insulating film from the throat height=0 point must be exposed.

In this case, since the plated underfilm is stuck on the inclined part, the light for expose is reflected at the plated underfilm. The part of the reflected light is reflected toward the pole portion. Thus, the exposed pattern of the pole portion is different from the exposing pattern of the photomask, resulting in the pattern destruction of the resist frame corresponding to the pole portion.

The pattern destruction of the resist frame is a large obstacle for realizing a high recording density by narrowing a recording track width up to 1.0 μm and below, for example.

Kokai publication No. 9-180127 discloses the technique that before applying a photoresist constituting a mask to form a magnetic film of a top yoke, an antireflection film is formed and on the antireflection film is applied a photoresist, which is exposed and developed, to form a resist frame as a mask for a second magnetic film. After forming the resist frame, the part of the antireflection film exposing to the bottom surface of the opening in the resist frame is removed by an ashing means, etc. and the second magnetic film is formed by plating, etc.

In the above conventional technique, the antireflection film exists in the whole bottom surface of the opening in the resist frame. The opening of the resist frame has a pole portion area corresponding to the pole portion of the top magnetic film and a yoke part area corresponding to a yoke part. Thus, the antireflection film has to be removed in both the pole portion area and the yoke part area.

However, the opening area in the pole portion area is remarkably different from that in the yoke part area. Moreover, for attaining a high density recording, the opening area of the pole portion area is inclined to be narrowed to a minute size of 1 μm and below, for example. Thus, in removing the part of the antireflection film stuck on the inner pattern surrounded by the resist frame, the etching rate of the yoke part area is different from that of the pole portion area and it takes longer time in etching the pole portion area than in etching the yoke part area. As a result, during the removing the antireflection film in the pole portion area, the resist frame is remarkably etched, resulting in the broadening the width of the pole portion of the resist frame and the lowering the height of the resist frame. Such phenomena degrade the pattern precision of the second magnetic film and make difficult to form a magnetic film having a given thickness.

SUMMARY OF THE INVENTION

It is an object of the present invention to provide a method of manufacturing a thin film magnetic head capable of forming, in a precise pattern, a magnetic film to be formed on a coil insulating film.

It is another object of the present invention to provide a method of manufacturing a thin film magnetic head capable of forming, in a precise pattern, a pole portion of a magnetic film to be formed on a coil insulating film.

It is still another object of the present invention to provide a method of manufacturing a thin film magnetic head capable of forming, in a precise pattern, a yoke portion of a magnetic film to be formed on a coil insulating film.

It is further object of the present invention to provide a method of manufacturing a thin film magnetic having a narrowed pole portion to realize a narrowed recording track width.

This invention relates to a method of manufacturing a thin film magnetic head comprising a first magnetic film constituting a bottom yoke, a second magnetic film constituting a top yoke, a thin film coil having a part sandwiched between the first and the second magnetic films, a coil insulating film supporting the thin film coil in insulation, a write gap film intervened at least between the pole portions of the first and the second magnetic films opposing to a magnetic recording medium, and a substrate to support the first and the second magnetic films, the thin film coil, the coil insulating film and write gap film, the coil insulating film having an inclined part rising up from the rear ends of the pole portions, the second magnetic film extending alongside the inclined part of the coil insulating film from the pole portion, comprising the steps of:

forming the second magnetic film after forming the first magnetic film, the write gap film, the thin film coil and the coil insulating film, forming an antireflection film so as to cover at least the inclined part on the surface of the coil insulating film and not to cover an area corresponding to the pole portions, applying a photoresist so as to cover at least the antireflection film and the part of the write gap film corresponding to the pole portions, forming a resist frame having an opening with a pattern corresponding to the second magnetic film pattern to be formed by performing photolithography for the photoresist, removing the part of the antireflection film surrounded by the opening pattern of the resist frame, forming the second magnetic film in the opening of the resist frame in which the part of the antireflection film is removed, and removing the resist frame and the remaining antireflection film.

As above-mentioned, since the antireflection film is formed on at least the surface part including the inclined parts of the surface of the insulating film, in the process of forming the resist frame through photolithography for the second magnetic film, a reflecting ratio of a light for expose at the inclined part of the coil insulating film become small remarkably. Consequently, according to the present invention, the pole portion having a precise pattern can be formed. Moreover, since the opening pattern of the resist frame corresponding to the pole portion can be set high precisely, the thin film magnetic head having the narrowed pole portion to realize a narrowed recording track width of 1.0 μm and below can be produced easily and precisely.

Moreover, since the part of the antireflection film in the opening pattern of the resist frame is removed, and thereafter, the second magnetic film is formed in the opening pattern from which the part of the antireflection film is removed, the magnetic characteristics of the second magnetic film does not be influenced by the antireflection film.

Moreover, since the antireflection film is not formed in the area of the opening pattern in the resist frame corresponding to the pole part, it is not required to remove the part of the antireflection film in the area, so that the part of the antireflection film exposing to the bottom surface in the area corresponding to the yoke part. Thus, the problem of the degradation of the opening pattern precision due to a difference in the etching rates between the yoke part area and the pole portion area or the lowering of the height of the resist frame does not occur. Consequently, the pole portion and yoke part can be formed in a precise pattern.

Furthermore, since, after the second magnetic film is formed, the remaining antireflection film is removed with the resist frame, the thin film magnetic head as a final product does not influenced by the antireflection film.

The antireflection film is formed of a material selected from the group consisting of derivatives of a polysulfone polymer and a derivative of a maleimidevinyl copolymer. A reflectance of such a material is much smaller than that of the underfilm to form the second magnetic film with electroplating. Moreover, the material can be easily formed through a spin coating method and easily removed by dry-etching such as ashing.

BRIEF DESCRIPTION OF THE DRAWINGS

For a better understanding of this invention, reference is made to the attached drawings, wherein:

FIG. 1 is a perspective view of a thin film magnetic head to be produced by the method according to the present invention, FIG. 2 is a cross sectional view of the thin film magnetic head shown in FIG. 1, FIG. 3 is a cross sectional view showing a manufacturing step of the thin film magnetic head shown in FIGS. 1 and 2, FIG. 4 is a cross sectional view, taken on line "4—4" of FIG. 3, FIG. 5 is a plan view of the thin film magnetic head shown in FIGS. 3 and 4, FIG. 6 is a cross sectional view showing the next step of the manufacturing step shown in FIG. 3, FIG. 7 is a cross sectional view, taken on line "7—7" of FIG. 6, FIG. 8 is a plan view of the thin film magnetic head shown in FIGS. 6 and 7, FIG. 9 is a cross sectional view showing the next step of the manufacturing step of FIG. 6, FIG. 10 is a cross sectional view, taken on line "10—10" of FIG. 9, FIG. 11 is a plan view of the thin film magnetic head shown in FIGS. 9 and 10, FIG. 12 is a cross sectional view showing the next step of the manufacturing step of FIG. 9, FIG. 13 is a cross sectional view, taken on line "13—13" of FIG. 12, FIG. 14 is a plan view of the thin film magnetic head shown in FIGS. 12 and 13, FIG. 15 is a cross sectional view showing the next step of the manufacturing step of FIG. 12, FIG. 16 is a cross sectional view, taken on line "16—16" of FIG. 15, FIG. 17 is a plan view of the thin film magnetic head shown in FIGS. 15 and 16, FIG. 18 is a cross sectional view showing the next step of the manufacturing step of FIG. 15, FIG. 19 is a cross sectional view, taken on line "19—19" of FIG. 18, FIG. 20 is a plan view of the thin film magnetic head shown in FIGS. 18 and 19, FIG. 21 is a cross sectional view showing the next step of the manufacturing step of FIG. 18, FIG. 22 is a cross sectional view, taken on line "22—22" of FIG. 21, FIG. 23 is a plan view of the thin film magnetic head shown in FIGS. 21 and 22, FIG. 24 is a cross sectional view showing the next step of the manufacturing step of FIG. 21, FIG. 25 is a cross sectional view, taken on line "25—25" of FIG. 24, FIG. 26 is a plan view of the thin film magnetic head shown in FIGS. 24 and 25, FIG. 27 is a cross sectional view showing the next step of the manufacturing step of FIG. 24, FIG. 28 is a cross sectional view, taken on line "28—28" of FIG. 27, FIG. 29 is a plan view of the thin film magnetic head shown in FIGS. 27 and 28, FIG. 30 is a cross sectional view showing the next step of the manufacturing step of FIG. 27, FIG. 31 is a cross sectional view, taken on line "31—31" of FIG. 30, FIG. 32 is a plan view of the thin film magnetic head shown in FIGS. 30 and 31.

DETAILED DESCRIPTION OF PREFERRED EMBODIMENTS

Figure 33:
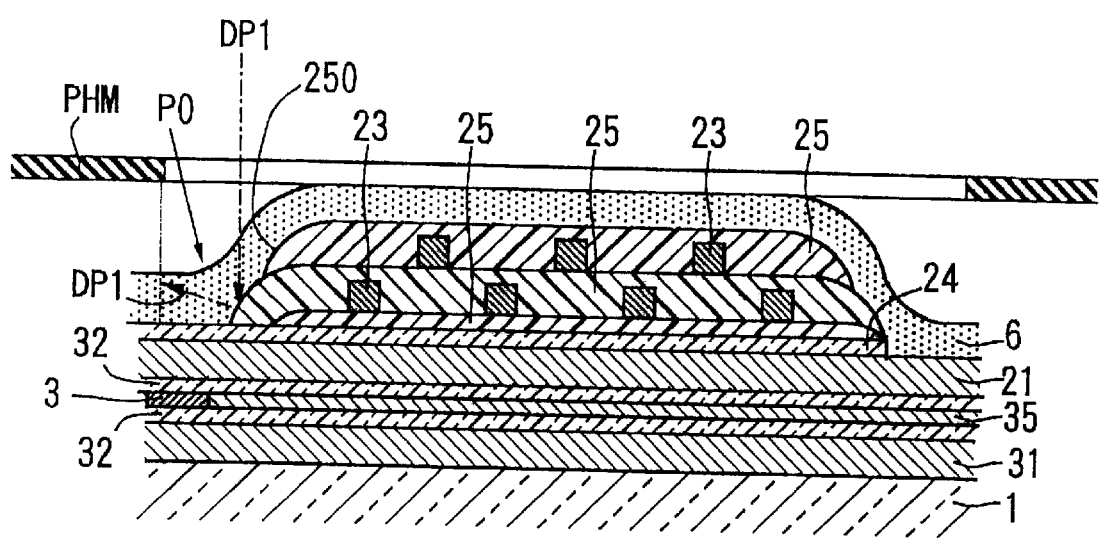
FIG. 33 is a cross sectional view for explaining the problems in the conventional thin film magnetic head.

FIG. 1 is a perspective view of the thin film magnetic head to be produced by the method according to the present invention and FIG. 2 is a cross sectional view of the thin film magnetic head shown in FIG. 1. In these figures, a size of each part is illustrated with exaggeration. An illustrated thin film magnetic head has a slider 1 and at least one inductive type thin film magnetic conversion element 2.

The slider 1 has rail parts 11 and 12 on its opposing surface to a magnetic recording medium and the surfaces of the rail parts 11 and 12 are employed as air bearing surfaces (ABSs) 13 and 14. The slider 1 does not always have the two rail parts 11 and 12, and may have one to three rail parts. Moreover, the slider may a flat surface having no rail part. For improving its floating characteristic, the slider may have an opposing surface with various geometrical shape to a recording medium. The method of the present invention can be applied for the sliders having the above various types of surface. The slider 1 is made of a ceramic material such as AlTiC.

The thin film magnetic conversion element 2 includes a first magnetic film 21, a write gap film 24, a second magnetic film 22, a thin film coil 23, a coil insulating film 25 and a protective layer 26 and is provided on the slider 1. The thin film coil 23 is supported by the coil insulating film 25. The first magnetic film 21, the write gap film 24, the second magnetic film 22, the thin film coil 23, the coil insulating film 25 and the protective film 26 are made of materials well known by the ordinary person skilled in the art and have thicknesses and patterns known by them as well. Moreover, they may be produced by normal means. The favorably concrete examples are exemplified as follows:

First of all, the first magnetic film 21 is formed, of a soft magnetic material such as NiFe, CoFe, CoFeNi, in a thickness of 0.5–4 $\mu$m. As the forming method, a plating method and a sputtering method etc. may be used.

The second magnetic film 22 is formed, of a soft magnetic material such as NiFe, CoFe, CoFeNi, in a thickness of 3–5 $\mu$m. As the forming method, a frame plating method can be used. The details will be described hereinafter.

The thin film coil 23 is formed of a conductive material such as Cu. The thickness of the thin film coil 23 is preferably 2–5 $\mu$m. The thin film coil 23 may be formed by a frame plating method, etc.

The write gap film 24 may be made of a non-magnetic insulating material such as $Al_2O_3$, $SiO_2$ or a non-magnetic metallic material. In making the film of the non-magnetic insulating material such as $Al_2O_3$, $SiO_2$, a sputtering method etc. may be used. In making the film of the non-magnetic metallic material, a plating method or a sputtering method can be used. The thickness of the write gap film is preferably 0.01–0.5 $\mu$m.

The coil insulating film 25 is preferably formed through the hardening of a photoresist material. The layer number and the thickness of the coil insulating film 25 changes, depending on the layer number of the thin film coil 23 and the coil-supporting structure. Generally, the coil insulating film 25 has a thickness of about 3–20 $\mu$m.

The protective film 26 may be made of an insulating material such as $Al_2O_3$, $SiO_2$. Its thickness is preferably about 5–50 $\mu$m. The protective film 26 can be formed by a sputtering method, etc.

The thin film coil 23 constitutes a thin film magnetic circuit with the first magnetic film 21, the second magnetic film 22 and the write gap film 24. The thin film coil 23 is supported by the coil insulating film 25 and is formed so as to turn spirally around a connecting part of a yoke part. Both ends of the thin film coil 23 is conductively connected to taking out electrodes 27 and 28 (see, FIG. 1). The winding number and the layer number of the thin film coil 23 are not limited. In this example, the thin film coil 23 has two layered structure.

In the illustrated thin film magnetic head, since the slider 1 has ABSs 13 and 14 on its opposing surface to a medium and the thin film magnetic conversion element is provided on the slider 1, the thin film magnetic head can be employed as a floating thin film magnetic head which is used combined with a magnetic recording medium such as a magnetic disk.

Since the yoke part 221 of the second magnetic film 22 is magnetically connected to the first magnetic film 21 in its rear side, the magnetic field generated by flowing a writing current in the thin film coil 23 can be effectively conducted to a first pole portion 210 and a second pole portion 220 via the yoke part 221.

The thin film magnetic head shown in FIGS. 1 and 2 is a composite type thin film magnetic head having the inductive type magnetic conversion element 2 for writing and the MR (magnetoresistive effective) element 3 for reading. The thin film magnetic conversion elements 2 and 3 are provided on one end or both ends of the railing parts 11 and 12 as are viewed from a moving direction al of a recording medium. The recording medium moving direction al corresponds to an outflow direction of an air when the recording medium moves at a high speed. On the end of the recording medium moving direction al of the slider 1 are provided the taken out electrodes 27 and 28 connected to the thin film magnetic conversion element 2 and taken out electrodes 33 and 34 connected to the thin film magnetic conversion element 3.

As the MR element, various film structures have been proposed and practically used. For example, a MR element using an anisotropic magnetoresistive (IMR) effective element, a giant magnetoresistive (GMR) effective film or a tunnel connection magnetoresistive (TMR) effective film is exemplified. In this invention, any kind of the above film structures may be employed. The MR element 3 is positioned, between a first shield film 31 and a first magnetic film 21 doubling as a second shield film in an insulating film 32. The insulating film 32 is made of alumina, etc. The MR element 3 is connected to the take out electrodes 33 and 34 (see, FIG. 1) via a leading conductor 35 (see, FIG. 2).

Next, an embodiment of a manufacturing method according to the present invention for the thin film magnetic head shown in FIGS. 1 and 2 will be described. FIGS. 3–32 show successive manufacturing steps of the manufacturing method of the thin film magnetic head according to the present invention. The same reference for the same part in FIGS. 3–32 as that in FIGS. 1 and 2 is given. Although in a real manufacturing process, many thin film magnetic head are formed on a wafer, in those figures, only one element on the wafer is shown.

First of all, the manufacturing method will be explained, with reference to FIGS. 3–5. FIG. 3 shows a state in which the first shield film 31, the MR element 3 positioned in the insulating film 32, the first magnetic film 21, the write gap film 24, the thin film coil 23 and the coil insulating film 25 are formed so as to be supported by the slider 1, and is a cross sectional view of the assembly, taken on the perpendicular surface to the air bearing surface. FIG. 4 is a cross sectional view of FIG. 3, taken on line "4–4" and FIG. 5 is a plan view of the magnetic conversion element shown in FIGS. 3 and 4. The relative size of each part in FIGS. 3–5 is different from the real one. The steps of forming, on the substrate 1 to be a slider, the first magnetic film 21, the write gap film 24 and the coil insulating film 25 to support the thin film coil 23 are well known and not substantial part, but may be carried out by the following method:

An insulating layer is formed, of alumina, in a thickness of about 3–5 μm on one surface of a substrate body made of AlTiC to obtain the slider 1, the substrate. The first shield layer 31 for a magnetoresistive effective type thin film magnetic head is formed, of permalloy, in a thickness of about 3 μm alongside a given pattern by a plating method with a photoresist as a mask. Subsequently, on the insulating film 32, made of alumina, having a thickness of 0.2 μm are formed, in a given pattern, the MR element 3 and the leading conductor 35, on which the insulating layer is formed of alumina. Then, the first magnetic layer 21 constituting a top shield for the MR element 32 and a bottom pole for an inductive type thin film magnetic head is formed, of permalloy, in a thickness of 3–4 μm. On the first magnetic layer 21 is formed, in a thickness of 0.2–0.3 μm, the write gap layer 24 made of alumina, on which the two layered thin film coil 23 is formed, insulated by the coil insulating film 25. The thin film coil 23 can be formed in a given pattern by Cu-electroplating. The coil insulating film 25 is made of photoresist, and after each coil of the thin film coil 23 is formed, the thus obtained assembly is annealed at a temperature of 200–250° C.

As shown in FIG. 3, the coil insulating film 25 has an inclined portion 250 rising up in slope at an angle of θ from the back end of the pole portion of the write gap film 24. The rising up-starting point of the inclined part 250 corresponds to a position of throat height=0 and the rising up angle θ corresponds to an apex angle.

Next, as shown in FIGS. 6–8, an antireflection film 4 is formed. In this invention, the antireflection film 4 is formed on at least the surface including the inclined part 250 of the whole surface of the coil insulating film 25. In the figure, the antireflection film is formed so as to cover the whole surface of the coil insulating film 25 and the exposing surface of the write gap film 24.

The antireflection film 4 may be preferably made of a derivative of a polysulfone polymer:

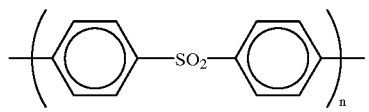

n = 1–20 or a derivative of a maleimidevinyl copolymer:

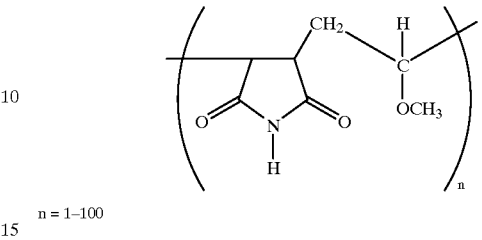

n = 1–100

The antireflection film may be made of the above polymer by a spin coating method, etc.

Next, the antireflection film 4 is patterned so that its part may remain on the inclined part 250. In patterning the antireflection film 4, a photoresist is applied on the whole surface of the antireflection film 4. Subsequently, the photoresist is patterned so that its part to be a mask for the antireflection film 4 may remain in the requiring area for the mask. FIGS. 9–11 show a mask pattern 5 of the photoresist patterned by the above step. The mask pattern 5 covers the inclined part 250 of the insulating film 25, particularly the part of the inclined part 250 connecting to a pole portion area P0, not the pole portion area P0 itself.

Thereafter, as shown FIGS. 12–14, the part of the antireflection film 4 on the uncover part of the pole portion area P0 with the mask pattern is removed. The antireflection made of the derivative of the polysulfone polymer or the maleomidevinyl copolymer can be easily removed by dry-etching such as ashing. Thereby, the antireflection film does not exist on the pole portion area uncovered by the mask pattern. In this way, the remaining of the antireflection film in the requiring area enables the bad influences of the antireflection film against another step or a material constituting another part, etc. to be avoided.

Next, as shown in FIGS. 15–17, the mask pattern is removed and thereafter, as shown in FIGS. 18–20, a photoresist 6 is applied so as to cover the exposing surfaces of the antireflection film 4 and the coil insulating film 25. The photoresist 6 may be applied by a spin coating method. A photomask PHM is set on the photoresist 6 and a photolithography to form the second magnetic film is carried out. Thereby, as shown in FIGS. 21–23, a resist frame 60 is formed. The opening of the resist frame 60 is denoted as reference numeral "61".

Since the part of the antireflection film 4 exists on the inclined part 250 connecting the pole portion area P0, in the photolithograhy of the photoresist 6 for the second magnetic film, a reflectance of an exposing light at a plated underfilm formed on the inclined part 250 of the coil insulating film 25 becomes conspicuously small. Thus, particularly, the exposed pattern of the pole portion area P0 is almost determined by the exposing pattern of the photomask PHM, and the minute pattern corresponding to the minute pole portion area P0 in the opening 61 formed at the resist frame 60 can be provided in a high precise shape determined by the precision of the photolithography process. In making the antireflection film 4 of a material selected from the derivative of the polysulfone polymer or the maleimidevinyl copolymer, the material has a lower reflectance than that of the plated underfilm, so that the pattern of the resist frame 60 corresponding to the pole portion area P0 is formed more precisely.

FIG. 33 shows a conventional thin film magnetic head assembly without the antireflectance film 4. Without the antireflectance film, a light Dpl for expose is reflected at the plated underfilm already formed on the inclined part 250. The part of the reflected exposing light Dpl is reflected toward the pole portion area P0. Thus, the exposed pattern of the pole portion area P0 is different from the exposing pattern of the photomask PHM, resulting in the pattern destruction of the part of the resist frame 60 corresponding to the pole portion area P0.

Next, as shown in FIGS. 24–26, the part of the antireflection film 4 (see, FIGS. 21–23) exposed on the bottom surface of the opening 61 of the resist frame 60 is removed. The part of the antireflection can be removed by a dry-etching method such as ashing. Hereupon, since the antireflection film 4 does not exist on the pole portion area P0 (see, FIGS. 12–17), the part of the antireflection film 4 in the opening 61 of the resist frame 60 has only to be removed. Accordingly, the problems of the degradation of the opening pattern precision of the resist frame 60 due to a difference in the etching rates between a yoke part area and the pole portion area P0 and of the lowering of the height of the resist frame 60 do not occur.

Next, as shown in FIGS. 27–29, the second magnetic film 22 is formed in the opening pattern 61 of the resist frame 60. The second magnetic film 22 constitutes a second pole portion 220 parallel to the write gap film 24 and the first magnetic film 21 up to the position of throat height=0 and is inclined at the apex angle θ up to the coil insulating film 25 from the position of throat height=0.

Since the pattern of the opening 61 of the resist frame 60 to determine the second pole portion 220 is provided so as to have a high precise size and shape almost determined by the exposing pattern of the photomask, the second pole portion 220 can have a high precise pattern. In this way, since the opening 61 of the resist frame 60 corresponding to the second pole portion 220 can be formed precisely, the thin film magnetic head having a narrowed recording track width of not more than 1.0 μm can be produced. Moreover, since the second magnetic film 22 is formed in the opening 61 of the resist frame 60 (see, FIGS. 24–26) after the part of the antireflection film 4 in the opening 61 is removed, the magnetic characteristics of the second magnetic film 22 does not influenced by the antireflection film 4.

Furthermore, as is explained with reference to FIGS. 12–17, since the problems of the degradation of the opening pattern precision of the resist frame 60 due to a difference in the etching rates between a yoke part area and the pole portion area P0 and of the lowering of the height of the resist frame 60 do not occur, the pole portion 220 and the yoke part 221 of the second magnetic film 22 can be formed by using the high precise pattern.

Subsequently, as shown in FIGS. 30–32, the resist frame 60 and the remaining part of the antireflection film 4 are removed. They may be removed by a dissolving method with an organic solvent or a dry-etching method such as ashing. In this way, after the second magnetic film 22 is formed, the antireflection film 4 is removed with the resist frame 60, so that the thin film magnetic head as a final product (see, FIGS. 1 and 2) is not influenced by the antireflection film 4.

The antireflection film 4 remains on the inclined part 250 of the coil insulating film, but does not on the pole portion area P0 (see, FIGS. 12–17). Thus, in forming the second magnetic film 22, the part of the antireflection film in the opening 61 of the resist frame 60 has only to be removed, which does not results in the problems of the degradation of the opening pattern precision of the resist frame 60 due to a difference in the etching rates between a yoke part area and the pole portion area P0 and of the lowering of the height of the resist frame 60. Consequently, the pole portion 220 and the yoke part 221 of the second magnetic film 22 can be formed by using the high precise pattern.

The manufacturing method according to the present invention requires that the antireflection film be not formed on the pole portion area. Thus, such a requirement is also satisfied by the following method: For example, a peeling film having a given composition is formed only on the pole portion area in advance, and thereafter, an antireflection film is formed. Then, the part of the antireflection film stuck on the peeling film is selectively removed with the peeling film by a lift-off method.

Although the pole portion composed of the first magnetic film 21, the write gap film 24 and the second magnetic film 22 can have various structures and configurations for attaining a high density recording, for example, the manufacturing method of the present invention can be widely applied for the various structures and configurations.

In the above embodiment, the composite type thin film magnetic head having the writing inductive type magnetic conversion element 2 and the reading magnetoresistive effective type thin film magnetic head including the MR element 3 is produced, and the MR element 3 may be formed by a normal method before forming the inductive type magnetic conversion element 2. Moreover, the magnetoresistive effective type thin film magnetic head may be formed on the inductive type thin film magnetic head formed on the substrate.

Moreover, not shown in the figures, needless to say, the steps required for completing the thin film magnetic head shown in FIGS. 1 and 2 are carried out after the thin film magnetic head assembly shown in FIGS. 30–32 is obtained. The steps may be performed by a conventionally known method.

This invention has been described in detail with reference to the above preferred concrete embodiments, but it is obvious for the ordinary person skilled in the art that various modifications can be made in its configuration and detail without departing from the scope of this invention.

As mentioned above, this invention can provide the following effects:

(a) A manufacturing method of a thin film magnetic head by which a magnetic film can be formed on a coil insulating film so as to have a high precise pattern can be provided.

(b) A manufacturing method of a thin film magnetic head by which a pole portion of a magnetic film formed on a coil insulating film can be formed so as to have a high precise pattern can be provided.

(c) A manufacturing method of a thin film magnetic head by which a yoke part of a magnetic film formed on a coil insulating film can be formed so as to have a high precise pattern can be provided.

(d) A manufacturing method suitable for manufacturing a thin film magnetic head having a narrowed pole portion to realize a narrowed recording track width can be provided.

What is claimed is:

1. A method of manufacturing a thin film magnetic head comprising a first magnetic film constituting a bottom yoke, a second magnetic film constituting a top yoke, a thin film coil having a part sandwiched between the first and the second magnetic films, a coil insulating film supporting the thin film coil in insulation, a write gap film intervened at least between the pole portions of the first and the second magnetic films opposing to a magnetic recording medium, and a substrate to support the first and the second magnetic films, the thin film coil, the coil insulating film and write gap film, the coil insulating film having an inclined part rising up from the rear ends of the pole portions, the second magnetic film extending alongside the inclined part of the coil insulating film from the pole portion, comprising the steps of:

forming the second magnetic film after forming the first magnetic film, the write gap film, the thin film coil and the coil insulating film, forming an antireflection film so as to cover at least the inclined part on the surface of the coil insulating film and not to cover an area corresponding to the pole portions, applying a photoresist so as to cover at least the antireflection film and the part of the write gap film corresponding to the pole portions, forming a resist frame having an opening with a pattern corresponding to the second magnetic film pattern to be formed by performing photolithography for the photoresist, removing the part of the antireflection film surrounded by the opening pattern of the resist frame, forming the second magnetic film in the opening of the resist frame in which the part of the antireflection film is removed, and removing the resist frame and the remaining antireflection film.

2. A method of manufacturing a thin film magnetic head as defined in claim 1, wherein the antireflection film-forming step includes the steps of forming the antireflection film on the coil insulating film entirely and the exposing surface of the write gap film and selectively removing the antireflection film formed on the area corresponding to the pole portions.

3. A method of manufacturing a thin film magnetic head as defined in claim 1, wherein the antireflection film-forming step includes the steps of selectively forming a peeling film on the area corresponding to the pole portions on the exposed surface of the write gap film, forming the antireflection film on the whole coil insulating film, the exposing surface of the write gap film and the peeling film, and removing the peeling film with the part of the antireflection film formed on the peeling film.

4. A method of manufacturing a thin film magnetic head as defined in claim 1, wherein the antireflection film is made of a material selected from the group of derivatives of a polysulfone polymer and a maleimidevinyl copolymer.

5. A method of manufacturing a thin film magnetic head as defined in claim 4, wherein the part of the antireflection film in the opening of the resist frame is removed by dry-etching.

6. A method of manufacturing a thin film magnetic head as defined in claim 5, wherein the part of the antireflection film in the opening of the resist frame is removed by ashing.

7. A method of manufacturing a thin film magnetic head as defined in claim 4, wherein the antireflection film is formed by a spin coating method.

8. A method of manufacturing a thin film magnetic head as defined in claim 1, further comprising the step of forming a magnetoresistive effective element so as to be supported by the substrate, whereby a composite type thin film magnetic head having an inductive type thin film magnetic head and a magnetoresistive effective type thin film magnetic head which are stacked each other is produced.

9. A method of manufacturing a thin film magnetic head as defined in claim 8, wherein one shield film of the magnetoresistive effective type thin film magnetic head is formed on the surface of the substrate and, after the magnetoresistive effective element is formed on the one shield film so as to be embedded in a shield gap film, the first magnetic film is formed so as to constitute the other shield film of the magnetoresistive effective type thin film magnetic head.

* * * * *